United States Patent [19]

Dolcimascolo et al.

[11] Patent Number: 5,094,613
[45] Date of Patent: Mar. 10, 1992

[54] HEAT FIXING ROLLER HAVING POWDER METAL GUDGEON

[75] Inventors: Charles Dolcimascolo, Fairport; Allen Kass, Pittsford, both of N.Y.

[73] Assignee: Eastman Kodak Company, Rochester, N.Y.

[21] Appl. No.: 506,316

[22] Filed: Apr. 9, 1990

[51] Int. Cl.⁵ .................. F27B 9/28; F16C 35/08; G03G 15/20
[52] U.S. Cl. ........................ 432/60; 464/184; 355/282; 219/216; 419/2; 428/566
[58] Field of Search .................. 464/184, 903; 29/123; 355/282, 285, 286; 219/216, 388; 432/60; 75/246; 428/566; 419/2, 45, 48

[56] References Cited

U.S. PATENT DOCUMENTS

| | | | |
|---|---|---|---|
| 3,620,690 | 11/1971 | Bergstrom | 75/246 |
| 3,940,269 | 2/1976 | Bergstrom | 419/41 |
| 4,229,950 | 10/1980 | Fessenden | 29/123 |
| 4,536,076 | 8/1985 | Bickerstaff et al. | 355/3 FU |

FOREIGN PATENT DOCUMENTS

| | | | |
|---|---|---|---|
| 2589258 | 4/1987 | France | 355/289 |
| 1-215481 | 8/1989 | Japan | |

OTHER PUBLICATIONS

Research Disclosure, 13027 (pp. 23, 24), Feb. 1975.
Abstract of Japanese Kokai No. J57-158867-A, Published 11/6/89.

Primary Examiner—R. L. Moses
Attorney, Agent, or Firm—Tallam I. Nguti

[57] ABSTRACT

A fixing mechanism is provided including a heated roller. The heated roller includes a core made of a high thermally conductive metallic material, and a gudgeon for supporting such a core. The gudgeon is made from powder metal stainless steel material that has an interconnected porosity of 20%.

26 Claims, 3 Drawing Sheets

| MATERIAL/MESH SIZE | DENSITY g/cc | % INTER-CONNECTED POROSITY | TENSILE STRENGTH PSI | SINTERING TEMP °F | THERMAL CONDUCTIVITY BTU-FT / HR-FT²-°F | |
|---|---|---|---|---|---|---|
| | | | | | RT | 400°F |
| 316 SS – WROUGHT | 8.02 | 0 | 82,000 | | 7.7 | 9.2 |
| 316 SS –10 +25 MESH | 4.7 | 36 | 1,467 | 2,300 | (REJECTED – LOW STRENGTH) | |
| 316 SS –30 +50 MESH | 4.8 | 34 | 2,600 | 2,250 | 1.55 | 1.94 |
| 316 SS –50 +100 MESH | 5.5 | 30 | 1,854 | 2,050 | (REJECTED – LOW STRENGTH) | |
| 316 SS –50 +100 MESH | 5.2 | 32 | 6,500 | 2,250 | (REJECTED – LOW STRENGTH) | |
| 316 SS –50 +100 MESH | 5.5 | 30.0 | 8,800 | 2,250 | (REJECTED – LOW STRENGTH) | |
| 316 SS –100 MESH | 5.8 | 23 | 15,800 | 2,050 | 3.41 | 4.01 |
| 316 SS –100 MESH | 6.28 | 11.4 | 20,442 | 2,050 | 4.71 | 5.74 |
| 316 SS –100 MESH | 6.81 | 0.79 | 65,000 | 2,250 | 6.03 | 7.47 |
| 316 SS –100 MESH | 6.0 | 20.9 | 25,000 | 2,325 | 4.0 | 5.0 |

HEAT FIXING ROLLER HAVING POWDER METAL GUDGEON

BACKGROUND OF THE INVENTION

Technical Field

This invention relates to heat fixing mechanisms in electrostatographic copiers and printers, and more particularly to a long life, heat efficient, and low cost fuser roller thereof having powder metal gudgeons.

In electrostatographic reproduction apparatus such as copiers and printers, it is well known, as disclosed in U.S. Pat. Nos. 4,229,950 and 4,536,076, to use a heat and pressure fixing mechanism including a heated roller for fusing a toner image onto a suitable receiver. The heated roller which may be heated internally or externally, may consist of an external coating and an inner core made of a high thermally conductive metallic material such as aluminum. Typically, the heated roller is supported to the frame of the copier or printer on a pair of gudgeons or end caps, and is rotatably driven, for example, by a motor connected to one of the gudgeons.

Ordinarily, in order to achieve excellent and cost effective fixing results, relatively high fusing pressures are required, and the heated roller must be repeatedly heated and maintained at a high and precise fusing temperature in the range of about 300°–400° F., for example. The supporting end caps or gudgeons therefore must be able to repeatedly withstand substantial forces at such a high temperature in order to produce the required fixing pressures. Additionally, for precisely controlling the fusing temperature heat loss (from the roller through the gudgeons to the surrounding environment) must be effectively minimized.

Conventionally, materials such as plastics, which have a relatively low thermal conductivity, have been used to construct gudgeons for such heated roller. Unfortunately, however, because such plastic materials do not have physical characteristics, for example, of strength, stiffness and rate of thermal expansion, that match those of the aluminum core of such a heated roller, the connection between such core and the gudgeon typically has involved the use of fastening means. The connection as such is therefore usually difficult to make as well as difficult to maintain. The undesirable result is early failure of the connection due to loosening or fracture of the fastening means. Over time, plastic gudgeons additionally tend to degrade under the high temperatures and pressures required for electrostatographic image fixing. On the otherhand, metallic gudgeons in general are unacceptable because of the relatively high thermal conductivity of metals.

However, because of the relatively low metallic thermal conductivity of powder metal materials, the use of powder metal materials such as powder metal stainless steel for constructing such gudgeons, has been suggested, for example, in U.S. Pat. No. 4,536,076. Unfortunately however, the thermal conductivity, even of a powder metal stainless steel gudgeon, can vary significantly depending on controllable parameters such as the density and the interconnected porosity of such gudgeon. More importantly, as suggested in Japanese kokai No. J57158867-A, the durability, and hence the life and cost, for example, of a heat fixing roller (including such a gudgeon) depends significantly on the manner and the stability of the connection between such gudgeon and the core of such roller.

SUMMARY OF THE INVENTION

It is an object of the present invention to provide, for an electrostatographic reproduction apparatus, a fixing mechanism including a heated roller having an improved connection between the core and gudgeon of such roller.

It is another object of the present invention to provide, for a heated roller, a gudgeon having a low thermal conductivity as well as physical characteristics (of strength and stiffness) which substantially match those of a metallic core of such roller.

In accordance with the present invention, a fixing mechanism is provided including a heated roller. The heated roller includes a core made of a high thermally conductive metallic material, and a gudgeon for supporting such a core. The gudgeon is made from an austenitic stainless steel powder metal part having an interconnected porosity of 20%.

BRIEF DESCRIPTION OF THE DRAWINGS

In the detailed description of the preferred embodiment of the invention presented below, reference is made to the accompanying drawings, in which:

FIG. 5 is a table of experimental results for optimizing the selection of material and process conditions for the gudgeons of the present invention.

DETAIL DESCRIPTION OF THE INVENTION

Figure 1:
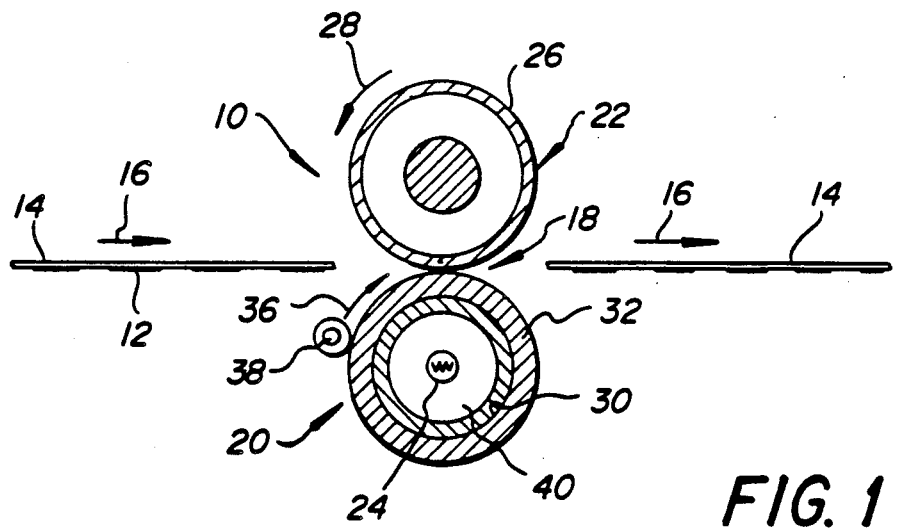
FIG. 1 is an end sectional view of the fixing mechanism of the present invention.

In the accompanying drawings, a heat and pressure fixing mechanism for an electrostatographic reproduction apparatus is designated generally as 10. The mechanism 10 is suitable for fusing and fixing loose toner images 12 being carried on a suitable receiver or copy sheet 14. For such fusing, the receiver or copy sheet 14 is fed in the direction of the arrow 16, through a fusing nip formed by a pair of fusing rollers 20, 22.

As shown, at least one of the rollers, for example roller 20, is heated by heat means 24, and constitutes the fusing member or fuser roller which supplies the heat required for fusing, and which directly contacts the toner images 12. The other roller 22 is the pressure roller supplying the pressure required for fixing the fused toner images 12 to the receiver or copy sheet 14. The pressure roller 22 for example may include a rigid thermally conductive shell 26 which is rotatable in the direction of the arrow 28.

Figure 2:
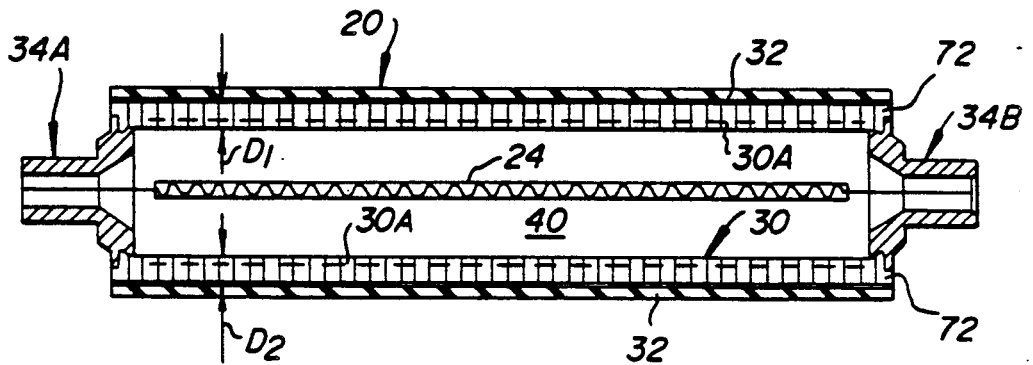
FIG. 2 is a longitudinal section of the heated roller of the present invention including a part of its heating means.

Referring now to FIGS. 1 and 2, the heated or fuser roller 20 is more fully illustrated. As shown, the heated roller 20 consists of a tubular core 30, a heat conducting and compliant outer layer 32, and a pair of gudgeons or end caps 34A, 34B for supporting the roller 20 within the apparatus 10. Supported therein as such, the roller 20 can be rotated by suitable drive means (not shown), in the direction of arrow 36.

To consistently achieve excellent and cost effective fixing results with the mechanism 10, the tubular core 30 and the gudgeons 34A, 34B of the heated roller 20 are made so as to maximize the heat efficiency of the roller 20, to last relatively longer, and to be relatively less expensive. The roller 20 is heated such that the temperature of its outer surface can be controlled at a high and precise point for example within the range of 300°-400° F. Additionally, the gudgeons 34A, 34B, which support the roller 20, must be capable of safely withstanding the substantial forces necessary for producing the pressures required for quality image fixing. Release of a fused receiver 14 from the fuser roller 20 may be enhanced by use of release oil applied to the surface of the roller 20, for example, by a release oil applicator roll 38.

The core 30 of the roller 20 is made of a high thermally conductive metallic material such as aluminum, and consists of the generally cylindrical wall 30A having a desired thickness T. The wall 30A defines an interior bore 40, an inner diameter $D_1$, and an outer diameter $D_2$ of the core 30.

For the gudgeons 34A, 34B, it has been found that austenitic stainless steel powder metal gudgeons which are produced by a special process (to be described below), and which are connected in a particular manner to the core 30, (a) will last a relatively long time, (b) will exhibit relatively low thermal conductivity, and (c) will have strength and stiffness characteristics that substantially match those of the aluminum core 30. Austenitic stainless steel can be defined as stainless steel composed principally of austenite alloyed with nickel. Austenite on the other hand is a type of iron including carbon in solution. Examples of austenitic stainless steels include AISI (American Iron and Steel Institute) type 303, 304 and 316 stainless steels. To increase the machinability of the gudgeon, 1-5% by weight of molybdenium disulfide may be added to the austenitic stainless steel powder.

The gudgeons of the present invention produced by such process have been found to have a sintered density of 6.0 gm/cc, an interconnected porosity of about 20%, and thermal conductivity (Btu-ft/Hr-ft$^2$-°F.) of about 5.0° at 400° F.

As is well known, the overall porosity of a solid part such as each gudgeon 34A, 34B, is the percentage of its total volume occupied by minute voids or spaces. Some of these voids or spaces are isolated one from the other, and others are interconnected one with another. The interconnected porosity of such a solid can be defined as as a network of such interconnected voids or spaces, within, and extending to the surface of, such part. The interconnected porosity of a part affects its thermal conductivity, and is a function of the raw material used for the part, and of the process for making the part. Interconnected porosity as such is controllable.

Gudgeons were made experimentally, under varying conditions, from several types of austenitic stainless steel powder including AISI type 316 powder having particle sizes $-10+25$ mesh, $-30+50$ mesh, $-50+100$ mesh, and $-100$ mesh as shown for example in FIG. 5. It was found that for maximum strength and minimum thermal conductivity, the stainless steel powder should have a particle size of minus one hundred mesh ($-100$ mesh). A minus one hundred mesh to plus five micron range in particle size is also acceptable.

In accordance with the process of the present invention, the $-100$ mesh stainless steel powder, for example, AISI type 316 SS powder, should be molded under a pressure of about 20 tons psi. The molding objective should be to achieve a green density of about 5.7 gm/cc, as well as to achieve as near an end shape as is possible so as to minimize post-molding machining. For such molding a lubricant, for example, lithium stearate, acro wax or similar material may be added to the powder at the rate of 0.5-1.0% by weight. It should be noted however that for such molding higher pressures, as much as 60 tons psi, may also be used if greater strength in the resulting gudgeon is required. However, it should be understood that increasing the molding pressure ordinarily will increase the thermal conductivity of the resulting gudgeon.

Figure 3A:
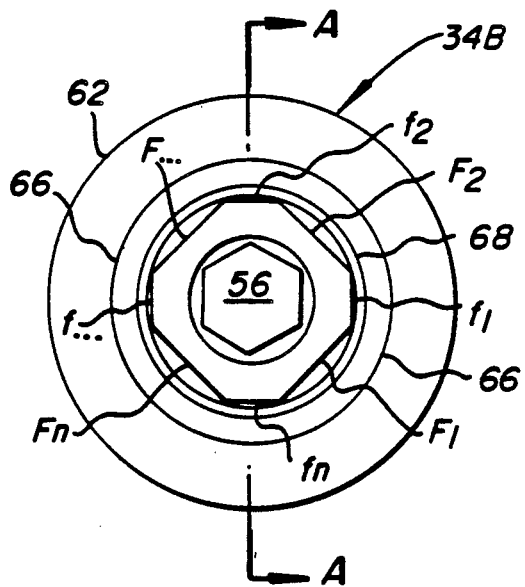
FIGS. 3A and 3B are end, and side section views of the gudgeon of the present invention unconnected to a roller core.
Figure 3B:
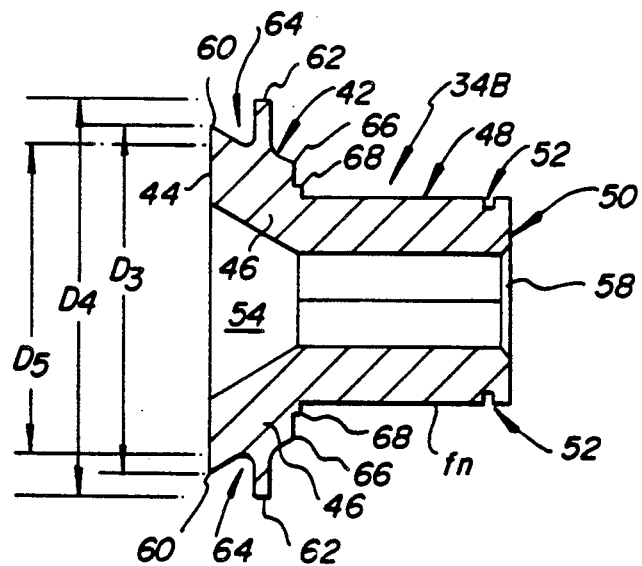

As shown in FIGS. 3A, 3B in particular, the gudgeon 34A, 34B should be molded, that is, the shape of the mold should be, such that machining thereafter is minimized in order to reduce gudgeon production costs. The gudgeon 34A, 34B, when molded as above should have a generally cylindrical head 42 which includes a face portion 44 and a shoulder portion 46. A body portion 48, which has a diametrical dimension less than that of the head 42, constitutes the journal portion of the gudgeon. The body portion 48 is angularly shaped and includes wide flanks $F_1$, $F_2$, ... $F_n$ and a plurality of narrow corner flats $f_1$, $f_2$... $f_n$. A four flanks, four corners shape is shown, but a hexagonal shape is equally acceptable. The narrow corner flats $f_1$, $f_2$... fn will actually form the bearing surfaces for the heated roller 20, thereby minimizing the area of contact between the heated roller 20 and its bearing. Such minimum contact also directly minimizes conductive heat loss from the heated roller to the bearing.

As shown, each gudgeon 34A, 34B includes a tail end 50 which has a circumferential retaining ring groove 52 cut partially into the corner flats $f_1$, $f_2$... $f_n$. Each gudgeon 34A, 34B also includes a generally cylindrical internal bore 54 that runs from the face 44 through to the tail end 50.

For further minimizing the machining and machining set up for each gudgeon 34A, 34B, the internal bore 54 is made so that it has an angular, for example, a hexagonal cross-section 56 at the tail end 50. Additionally, a chamfer is formed there at such end 50.

As shown further in FIGS. 3A, 3B in particular, the head 42 of each gudgeon 34A, 34B, includes a nose portion 60 which defines a first outer diameter $D_3$ of the head 42. A significantly raised flange portion 62 on the shoulder portion 46 defines a second outer diameter $D_4$ of the head 42, such that $D_4$ is significantly greater than $D_3$. Additionally, an undercut groove or mortise 64 is formed, for example, by machining between the nose portion 60 and the flange 62. The undercut 64 is formed so that the bottom or base thereof defines a third outer diameter $D_5$ of the head portion 42. The third diameter $D_5$ is made so as to be significantly less than the first diameter $D_3$.

As also shown, the area between the shoulder 46 and the body 48 of each gudgeon 34A, 34B includes a plurality of stepped sections shown as 66, 68 which will function to space the head 42 from means associated with the body 48, for supporting the roller 20.

In accordance with the process of the present invention, the molded gudgeon thereafter should be sintered at a temperature of 2,325° F. preferably in a vacuum furnace that includes atmosphere-reducing means. Sintering as such at this temperature or within the range of 2200°-2500° F. assures sufficient toughness and ductility of the resulting gudgeon. Lower sintering temperatures, for example, around 2050° can also be used if high toughness is not critical for the end use of the gudgeon. Most importantly however, the sintering should be such as to result in a sintered density of 6.0 gm/cc, as well as in an interconnected porosity of 20%. An interconnected porosity within the range of 15-25% is also acceptable.

The interconnected porosity of each gudgeon can be determined or tested by means of Standard Test No. ANSI/ASTM B 328, which is a test for determining density and interconnected porosity of sintered powder metal structural parts.

As is known, the sintered density, for example, of AISI type 316 stainless steel powder metal parts (such as the gudgeons 34A, 34B) as shown for example in FIG. 5, ordinarily varies. Similarly, the interconnected porosity of such parts also varies and can range from a low of 0.79% to values greater than 35%. It was found that the thermal conductivity of such parts increased with increasing sintered density, but with decreasing interconnected porosity. Additionally, it was found that the strength and ductility of the resulting parts varied directly with the density and inversely with the interconnected porosities. Optimum values therefore had to be found.

Accordingly, as shown for example in the table of FIG. 5, optimum results of strength, ductility and low thermal conductivity were found to occur when gudgeon parts, for example, of AISI 316 stainless steel powder (having a particle size of −100 mesh) were produced according to the molding and sintering steps described above.

According to the present invention, the sintered gudgeon 34A, 34B with the undercut or groove 64 machined therein, is thereafter connected to the core 30 of the roller 20. In order to increase the life of such a connection as well as to reduce the production costs involved, each gudgeon 34A, 34B is friction welded to the core 30. Friction welding accordingly eliminates the undesirable use of separate mechanical fastening components. Principally, such fastening means merely attach each gudgeon to the core 30. As pointed out above, such fastening means can fracture, loosen or otherwise fail under the high fixing temperatures and pressures of fixing mechanisms. Their elimination is therefore advantageous.

For friction welding of the core 30 to each gudgeon 34A, 34B, the inner diameter $D_1$ of the core 30 is made so as to be barely greater than the first outer diameter $D_3$ of the nose 60 of the head 42 of each gudgeon. The relationship of $D_1$ and $D_3$ as shown in FIG. 4B in particular should be such as to create a force fit of the nose portion 60, of each gudgeon 34A, 34B, into the bore 40 of the core 30. On the other hand, the second outer diameter $D_4$ of the head 42 of each gudgeon 34A, 34B, is made so as to be (a) greater than the inner diameter $D_1$ of the core 30, but (b) less than the outer diameter $D_2$ of the core 30. As such, the nose portion 60 of each gudgeon 34A, 34B can, with a reasonable force, be forced-fitted into an end of the core 30 until the inside portion of the wall thickness T lying between $D_3$ and $D_4$ catches against the flange portion 62 of the head 42 of such gudgeon. Properly aligned for friction welding, such initial force-fitting of the nose 60 into the core 40 at an end of the core 30, can be achieved at the start of the friction welding process.

As is well known, friction welding is a process in which the heat for welding is produced by means of rotation and pressing friction between the two parts being welded. Such heat results from direct conversion of the rotational and pressing mechanical energies into thermal energy. Typically one of the parts, for example, the core 30 in this case, is held stationary and the other part, for example each gudgeon 34A, 34B, is rotated relative to, while also being pressed into the stationary part.

As shown in FIG. 4B, in friction welding the core 30 and each gudgeon 34A, 34B, such rotational and pressing friction will occur between the flange portion 62 of each gudgeon 34A, 34B, and the inner portion of the thickness T of the aluminum wall 30A. A heat affected zone will thus be created between the flange 62 and the outside end of the inner portion of such wall thickness T, and directly over the initially empty undercut or groove 64 lying directly below the flange 62. As the thermal energy generated by such rotational and pressing friction increases, the aluminum material of the wall 30A within the heat affected zone will become plasticized, expand, and flow. Such flow will form an upset 70 that forcibly fills the initially empty groove 64. The friction welding process as such should be controlled so that the gudgeon, that is, the moving part, is stopped shortly after the groove 64 is filled by the upset 70, and is there maintained until the welding upset 70 cools and thermally contracts. The thermal contraction causes the upset 70 to catch and permanently bond mechanically against the walls of the groove 64. Such a mechanical bonding advantageously will not suffer from early failure, for example as do mechanical fasteners.

Thereafter, the friction welded assembly consisting of the core 30 and the gudgeons 34A, 34B can then be machine finished to the correct dimensions, and the roller 20 can be coated for mounting and use as the heated roller 20 in the fixing mechanism 10. The result is a heated roller with gudgeons that can each safely withstand the substantial forces necessary to produce the required fixing pressures, and for substantially longer lives than plastic gudgeons, and gudgeons that have a thermal conductivity of only about 5.0 (Btu-ft/hr-ft$^2$-°F.) at the high temperature of 400° F.

An additional advantage of the friction welding of the core 30 and gudgeons 34A, 34B of the roller 20, is that the friction welding also serves to extrude the outer portions of the aluminum wall 30A at the ends of the core. The extruded portion shown as 72 overlaps the nose 60, the groove 64, and the flange 62 of the head 42 of each gudgeon 34A, 34B. As such, the overlap 72 forms a uniform and continuous aluminum surface thereat on which to safely and effectively locate temperature control sensors for the roller 20. Without such an extrustion 72, a longer roller 20 would ordinarily be necessary, or such sensors would have to be located on a part of the low thermally conductive gudgeon where thermal response and control results are likely to be relatively inaccurate.

Figure 4A:
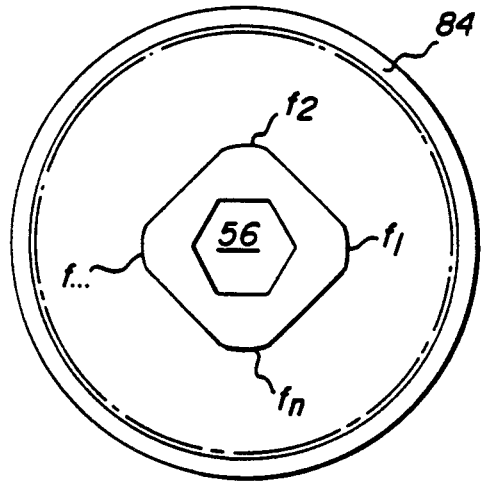
FIGS. 4A and 4B are end, and side section views of the gudgeon of the present invention connected by means of friction welding to the core of the roller of the present invention, and including means for mounting to a support frame.
Figure 4B:
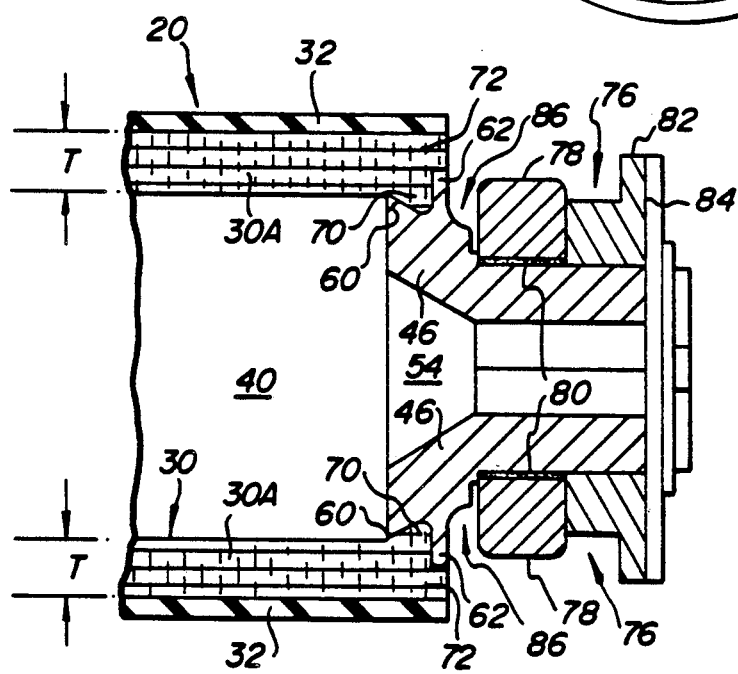

Referring now to FIGS. 4A and 4B, the fixing mechanism 10 further includes means 76 for mounting the heated roller 20, for example, to the frame of an electrostatographic reproduction apparatus. The means 76 for example includes a bearing 78 for the gudgeon 34A, 34B, and a thermally insulative sleeve 80 which is mounted between the bearing and the gudgeon for thermally insulating the bearing from the gudgeon. The means 76 further includes a plastic sprocket 82, mounted adjacent the bearing 78, for driving the gudgeon, as well as a retaining ring 84 assembled in the groove 52 for axially retaining the sprocket 84 on the gudgeon 34A, 34B. As shown, the mounting means 76 is assembled on the body 48 of each gudgeon 34A, 34B so as to leave or create an air pocket 86 between such mounting means 76 and the shoulder portion 46 of each gudgeon 34A, 34B.

The invention has been described in detail with particular reference to a preferred embodiment thereof, but it will be understood that variations and modifications can be effected within the spirit and scope of the invention.

What is claimed is:

1. A fixing mechanism for electrostatographic reproduction apparatus including a heated roller, the heated roller comprising:
    (a) a core, said core being made from a high thermally conductive metallic material; and
    (b) a gudgeon for supporting said core, said gudgeon being made from an austenitic stainless steel powder metal part having an interconnected porosity of 20%.

2. The fixing mechanism of claim 1 wherein said heated roller further includes a heat conducting and compliant outer layer.

3. The fixing mechanism of claim 1 wherein said heated roller includes a pair of said gudgeons, one at each end of said core.

4. The fixing mechanism of claim 1 wherein said gudgeon is made from minus one hundred mesh particle size powder.

5. The fixing mechanism of claim 1 wherein said gudgeon has a sintered density of 6.0 gm/cc.

6. The fixing mechanism of claim 1 wherein said gudgeon has an interconnected porosity of about 20%.

7. The fixing mechanism of claim 1 wherein said gudgeon has a generally cylindrical head including a face portion, a shoulder portion, and an angularly shaped journal body portion smaller in diameter than said head portion, said body portion having a plurality of narrow corner flats forming bearing surfaces thereto.

8. The fixing mechanism of claim 1 wherein said gudgeon has a thermal conductivity of about 5.0 BTU-FT/HR-FT$^2$-°F. at 400° F.

9. The fixing mechanism of claim 1 including means for mounting said heated roller to the frame of such copier or printer, said mounting means including:
    (a) a bearing for said gudgeon;
    (b) a thermally insulative sleeve mounted between said bearing and said gudgeon for thermally insulating said bearing from said gudgeon;
    (c) a sprocket mounted on said gudgeon adjacent said bearing for driving said gudgeon; and
    (d) a retaining ring mounted in a groove adjacent said sprocket for axially retaining said sprocket on said gudgeon.

10. The fixing mechanism of claim 1 wherein said gudgeon has a sintered density of about 6.0 gm/cc.

11. The fixing mechanism of claim 4 wherein said gudgeon is made from AISI type 316 stainless steel powder.

12. The fixing mechanism of claim 9 wherein said head and journal portions of said gudgeon include a generally cylindrical internal bore.

13. The fixing mechanism of claim 9 wherein said head of said gudgeon includes a nose portion defining a first outer diameter of said head, a flange portion defining a second and larger outer diameter to said head, and an undercut groove between said nose and said flange portions.

14. The gudgeon of claim 12 wherein said bore therein has an angular cross-section at the tail end of said gudgeon.

15. The fixing mechanism of claim 13 wherein said first outer diameter of said gudgeon head is barely less than the inner diameter of said core.

16. The fixing mechanism of claim 13 wherein said shoulder of said gudgeon includes a recessed area therein for forming an insulative air pocket between said shoulder and said bearing.

17. The heated roller of claim 13 wherein said second outer diameter of said gudgeon head is less than said outer diameter of said core.

18. The fixing mechanism of claim 13 wherein the bottom or base of said undercut groove forms a third outer diameter of said head, said third outer diameter of said head being less than said first outer diameter thereof.

19. The fixing mechanism of claim 13 wherein said undercut groove is filled by a contracted weld upset of the material of said core; said upset being created by means of friction welding.

20. A process for making stainless steel powder metal gudgeons to be connected to a heated roller of an electrostatographic fixing mechanism, the process including the steps of:
    (a) molding austenitic stainless steel powder so as to produce a gudgeon having a green density of 5.7 gm/cc; and
    (b) sintering the molded gudgeon at a temperature within the range 2200°-2500° F. so as to achieve an interconnected porosity of about 20%.

21. The process of claim 20 wherein the stainless steel powder being molded is −100 mesh AISI 316 stainless steel powder.

22. The process of claim 20 wherein the density of the gudgeon after sintering is 6.0 gm/cc.

23. The process of claim 20 wherein the stainless steel powder being molded includes 1-5% by weight of molybdenum disulfide for increased machinability.

24. The process of claim 20 wherein said molded gudgeon is sintered at a temperature of 2,325° F.

25. A process for making and connecting a stainless steel powder metal gudgeon to a metallic core heated roller of an electrostatographic fixing mechanism, the process including the steps of:
    (a) molding the stainless steel powder metal into a gudgeon having a generally cylindrical head including a nose portion and a shoulder flange portion;
    (b) sintering the molded gudgeon at a temperature within the range 2200°-2500° F. so as to achieve an interconnected porosity of about 20%; and
    (c) friction welding the head of the gudgeon to the metalic core of the heated roller such that the nose portion of the gudgeon forced-fits into an end of such core.

26. The process of claim 25 further including the step of machining an undercut groove, between the nose and shoulder flange portions of the sintered gudgeon, for receiving a welding upset during friction welding.

* * * * *